US012643695B2

(12) United States Patent　　(10) Patent No.: US 12,643,695 B2
Gil et al.　　(45) **Date of Patent:　\*Jun. 2, 2026**

(54) PNEUMATIC DELIVERY SYSTEM AND METHODS FOR USE

(71) Applicant: United Parcel Service of America, Inc., Atlanta, GA (US)

(72) Inventors: Julio Gil, Veldhoven (NL); Julian Bell, Decatur, GA (US); Jared Nauert, Louisville, KY (US)

(73) Assignee: Unitd Parcel Service of America, Inc., Atlanta, GA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/799,857

(22) Filed: Aug. 9, 2024

(65) Prior Publication Data

US 2024/0405338 A1　　Dec. 5, 2024

Related U.S. Application Data

(63) Continuation of application No. 17/711,733, filed on Apr. 1, 2022, now Pat. No. 12,100,853.

(Continued)

(51) Int. Cl.
*B64U 70/70*　　(2023.01)
*B64C 25/34*　　(2006.01)
(Continued)

(52) U.S. Cl.
CPC .............. *B64U 70/70* (2023.01); *B64C 25/34* (2013.01); *B64D 1/12* (2013.01); *B64D 1/22* (2013.01);
(Continued)

(58) Field of Classification Search
CPC ........ B65G 51/26; B65G 51/28; B65G 51/30; B65G 51/32
(Continued)

(56) References Cited

U.S. PATENT DOCUMENTS 720,395　A　2/1903　Ash et al.
3,948,466　A　4/1976　Rudder et al.
(Continued)

FOREIGN PATENT DOCUMENTS

CH　　　　508541　A　　6/1971
CN　　102785937　A　　11/2012
(Continued)

OTHER PUBLICATIONS

Non-Final Office Action received for U.S. Appl. No. 17/887,812, mailed on Jun. 11, 2025, 19 pages.
(Continued)

*Primary Examiner* — William R Harp
(74) *Attorney, Agent, or Firm* — Shook, Hardy & Bacon L.L.P.

(57)　　　　ABSTRACT

A pneumatic delivery system is used to facilitate delivery of canisters comprising delivery payloads by unmanned systems, such as unmanned aerial vehicles (UAVs). The pneumatic delivery system comprises a tube having a channel within a tube wall, where a canister is configured to move through the tube. The tube comprises a tube opening and a transfer mechanism proximate the tube opening. The transfer mechanism engages a canister having a payload that is moved within the tube. The transfer mechanism moves the canister through the tube opening by extending from a first transfer position to a second transfer position. At the second transfer position, the transfer mechanism orients the tube and releases it to a UAV for delivery.

17 Claims, 8 Drawing Sheets

Related U.S. Application Data

(60) Provisional application No. 63/237,392, filed on Aug. 26, 2021, provisional application No. 63/171,336, filed on Apr. 6, 2021.

(51) Int. Cl.

| | |
|---|---|
| *B64D 1/12* | (2006.01) |
| *B64D 1/22* | (2006.01) |
| *B64D 9/00* | (2006.01) |
| *B64F 1/32* | (2006.01) |
| *B64U 10/13* | (2023.01) |
| *B64U 10/14* | (2023.01) |
| *B64U 50/39* | (2023.01) |
| *B64U 60/00* | (2023.01) |
| *B64U 101/64* | (2023.01) |
| *B65G 51/26* | (2006.01) |
| *F15B 15/20* | (2006.01) |
| *H01M 50/249* | (2021.01) |

(52) U.S. Cl.
CPC ................. *B64D 9/00* (2013.01); *B64F 1/32* (2013.01); *B64U 10/13* (2023.01); *B64U 50/39* (2023.01); *B64U 60/00* (2023.01); *B65G 51/26* (2013.01); *F15B 15/20* (2013.01); *H01M 50/249* (2021.01); *B64U 10/14* (2023.01); *B64U 2101/64* (2023.01); *H01M 2220/20* (2013.01)

(58) Field of Classification Search
USPC .......................................... 406/110, 111, 112
See application file for complete search history.

(56) References Cited

U.S. PATENT DOCUMENTS

| | | | |
|---|---|---|---|
| 4,416,197 | A | 11/1983 | Kehl |
| 5,508,908 | A | 4/1996 | Kazama et al. |
| 5,697,625 | A | 12/1997 | Otto |
| 5,760,569 | A | 6/1998 | Chase, Jr. |
| 5,799,909 | A | 9/1998 | Ziegler |
| 5,868,357 | A | 2/1999 | Gabriel |
| 6,179,357 | B1 | 1/2001 | Gabriel |
| 6,310,771 | B1 | 10/2001 | Chien |
| 6,554,151 | B1 | 4/2003 | Brennan |
| 6,674,052 | B1 | 1/2004 | Luo |
| 7,509,995 | B2 | 3/2009 | Bhatti et al. |
| 7,631,444 | B1 | 12/2009 | Hursen |
| 7,635,065 | B1 | 12/2009 | Pettinger |
| 9,027,777 | B1 | 5/2015 | Steidinger, III |
| 9,033,281 | B1 | 5/2015 | Adams |
| 9,280,038 | B1 | 3/2016 | Pan et al. |
| 9,387,928 | B1 | 7/2016 | Gentry et al. |
| 9,412,280 | B1 | 8/2016 | Zwillinger et al. |
| 9,525,605 | B2 | 12/2016 | Wu et al. |
| 9,527,605 | B1 | 12/2016 | Gentry et al. |
| 9,650,133 | B2 | 5/2017 | Fisher et al. |
| 9,676,481 | B1 | 6/2017 | Buchmueller |
| 9,688,404 | B1 | 6/2017 | Buchmueller et al. |
| 9,957,048 | B2 | 5/2018 | Gil |
| 9,969,494 | B1 | 5/2018 | Buchmueller et al. |
| 9,981,745 | B2 | 5/2018 | Gil |
| 10,040,370 | B2 | 8/2018 | Wei et al. |
| 10,071,804 | B1 | 9/2018 | Buchmueller et al. |
| 10,246,187 | B2 | 4/2019 | Cantrell et al. |
| 10,274,952 | B2 | 4/2019 | Cantrell et al. |
| 10,435,156 | B2 | 10/2019 | Bellof et al. |
| 10,640,214 | B2 | 5/2020 | Lopez et al. |
| 10,807,714 | B2 | 10/2020 | Atchley et al. |
| 10,836,406 | B2 | 11/2020 | Lum et al. |
| 10,899,449 | B2 | 1/2021 | Luckay et al. |
| 11,187,200 | B1 | 11/2021 | Kolbe et al. |
| 11,225,325 | B1 | 1/2022 | Evans, II |
| 11,345,051 | B2 | 5/2022 | Zheng et al. |
| 11,453,498 | B2 | 9/2022 | Martens |
| 11,630,459 | B2 | 4/2023 | Georgeson et al. |
| 11,667,383 | B2 | 6/2023 | Evans, II |
| 12,195,198 | B2 * | 1/2025 | Columbus ............. B65G 51/02 |
| 2005/0000967 | A1 | 1/2005 | Najd |
| 2005/0023284 | A1 | 2/2005 | Heiberg et al. |
| 2008/0083756 | A1 | 4/2008 | Daniels |
| 2009/0198372 | A1 | 8/2009 | Hammerslag |
| 2014/0091172 | A1 | 4/2014 | Arlton et al. |
| 2014/0180914 | A1 | 6/2014 | Abhyanker |
| 2015/0197389 | A1 | 7/2015 | Bao et al. |
| 2016/0039300 | A1 | 2/2016 | Wang et al. |
| 2016/0068264 | A1 | 3/2016 | Ganesh et al. |
| 2016/0140851 | A1 | 5/2016 | Levy et al. |
| 2016/0257423 | A1 | 9/2016 | Martin |
| 2017/0015415 | A1 | 1/2017 | Chan et al. |
| 2017/0029101 | A1 | 2/2017 | Weissenberg |
| 2017/0038116 | A1 | 2/2017 | Ros |
| 2017/0217323 | A1 | 8/2017 | Antonini et al. |
| 2017/0313421 | A1 | 11/2017 | Gil |
| 2017/0316375 | A1 | 11/2017 | Gil |
| 2017/0349039 | A1 | 12/2017 | Rayner et al. |
| 2017/0368959 | A1 | 12/2017 | Hara et al. |
| 2018/0002015 | A1 | 1/2018 | Mccullough et al. |
| 2018/0062225 | A1 | 3/2018 | You et al. |
| 2018/0105063 | A1 | 4/2018 | Wei et al. |
| 2018/0160525 | A1 | 6/2018 | Satake et al. |
| 2018/0265222 | A1 | 9/2018 | Takagi |
| 2018/0312069 | A1 | 11/2018 | McClymond |
| 2018/0370618 | A1 | 12/2018 | Harris |
| 2019/0144007 | A1 | 5/2019 | Lum et al. |
| 2019/0291865 | A1 | 9/2019 | O'Donnell |
| 2020/0047353 | A1 | 2/2020 | Zheng et al. |
| 2021/0197982 | A1 | 7/2021 | Sweeny et al. |
| 2021/0229903 | A1 | 7/2021 | Goines, Jr. |
| 2022/0035381 | A1 | 2/2022 | Okuno et al. |
| 2022/0134899 | A1 | 5/2022 | Eide et al. |
| 2022/0315209 | A1 | 10/2022 | Gil et al. |
| 2022/0315222 | A1 | 10/2022 | Gil et al. |
| 2022/0315246 | A1 | 10/2022 | Gil et al. |
| 2022/0320669 | A1 | 10/2022 | Gil et al. |
| 2022/0380063 | A1 | 12/2022 | Shah et al. |
| 2023/0008634 | A1 | 1/2023 | Kabakov et al. |
| 2023/0060684 | A1 | 3/2023 | Julian |
| 2023/0063715 | A1 | 3/2023 | Bell |
| 2023/0131957 | A1 | 4/2023 | Lowenberg et al. |
| 2024/0387930 | A1 | 11/2024 | Bell |

FOREIGN PATENT DOCUMENTS

| | | | |
|---|---|---|---|
| CN | 110398983 | A | 11/2019 |
| CN | 110963033 | A | 4/2020 |
| CN | 112230672 | A | 1/2021 |
| CN | 113183824 | A | 7/2021 |
| DE | 102017209263 | A1 | 12/2018 |
| EP | 1993940 | A1 | 11/2008 |
| EP | 2644438 | A2 | 10/2013 |
| EP | 2868577 | A1 | 5/2015 |
| EP | 3177528 | A1 | 6/2017 |
| FR | 2685547 | A1 | 6/1993 |
| FR | 3075170 | A1 | 6/2019 |
| GB | 2605454 | A | 10/2022 |
| JP | 53-045890 | A | 4/1978 |
| JP | 01-176720 | A | 7/1989 |
| JP | 2017-083063 | A | 5/2017 |
| JP | 6176309 | B2 | 8/2017 |
| JP | 7616699 | B2 | 1/2025 |
| KR | 10-1778883 | B1 | 9/2017 |
| KR | 10-2019-0069968 | A | 6/2019 |
| KR | 10-2021105 | B1 | 9/2019 |
| KR | 10-2023-0164329 | A | 12/2023 |
| KR | 10-2024-0143483 | A | 10/2024 |
| WO | 95/21361 | A1 | 8/1995 |
| WO | 2015/061008 | A1 | 4/2015 |
| WO | 2015/158394 | A1 | 10/2015 |
| WO | 2015/158934 | A1 | 10/2015 |
| WO | 2016/019978 | A1 | 2/2016 |

(56) References Cited

FOREIGN PATENT DOCUMENTS

| WO | 2020/184166 | A1 | 9/2020 |
| WO | 2020/235744 | A1 | 11/2020 |
| WO | 2021/101735 | A1 | 5/2021 |

OTHER PUBLICATIONS

Office Action received for Canadian Patent Application No. 3227086, mailed on Jun. 27, 2025, 5 pages.

Final Office Action received for U.S. Appl. No. 17/711,739, mailed on Apr. 16, 2025, 10 pages.

Non-Final Office Action received for U.S. Appl. No. 17/712,451, mailed on Mar. 10, 2025, 10 pages.

Notice of Allowance received for U.S. Appl. No. 18/788,975, mailed on Apr. 9, 2025, 8 pages.

Non-Final Office Action received for U.S. Appl. No. 17/711,739, mailed on Sep. 26, 2024, 8 pages.

Notice of Allowance received for U.S. Appl. No. 17/711,730, mailed on Oct. 1, 2024, 9 pages.

Final Office Action received for U.S. Appl. No. 17/887,812, mailed on Feb. 13, 2025, 20 pages.

Non-Final Office Action received for U.S. Appl. No. 17/711,739, mailed on Aug. 12, 2025, 9 pages.

Non-Final Office Action received for U.S. Appl. No. 19/000,216, mailed on Aug. 12, 2025, 6 pages.

Non-Final Office Action received for U.S. Appl. No. 17/895,724, mailed on Feb. 2, 2026, 13 pages.

Non-Final Office Action received for U.S. Appl. No. 18/917,708, mailed on Jan. 14, 2026, 5 pages.

Notice of Allowance received for U.S. Appl. No. 19/000,216, mailed on Dec. 3, 2025, 9 pages.

Final Office Action received for U.S. Appl. No. 17/711,739, mailed on Feb. 19, 2026, 10 pages.

Non-Final Office Action received for U.S. Appl. No. 19/265,850, mailed on Feb. 19, 2026, 8 pages.

* cited by examiner

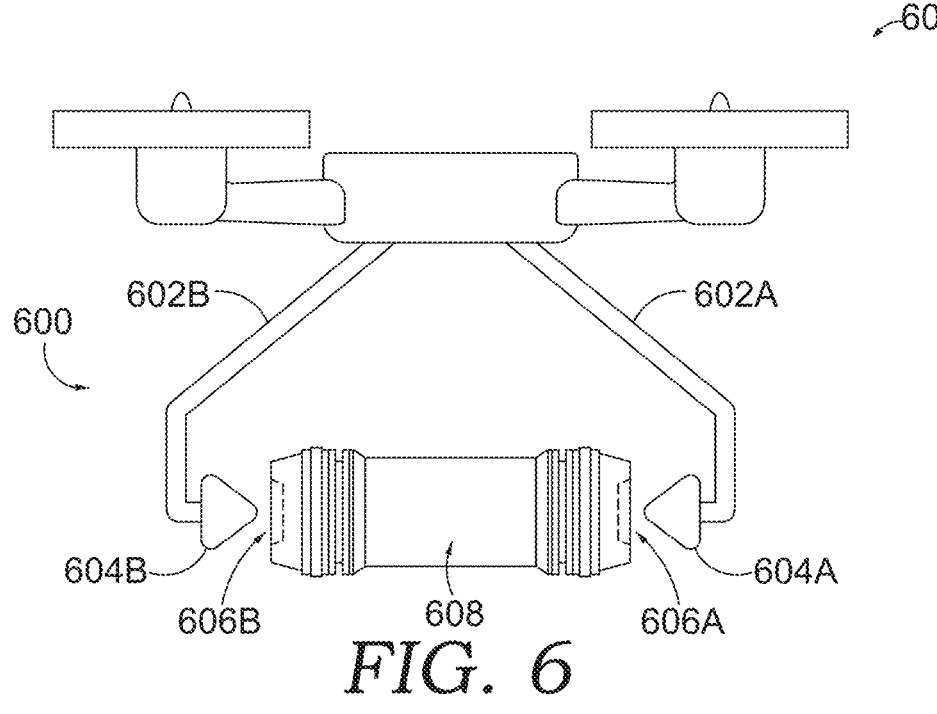
FIG. 6
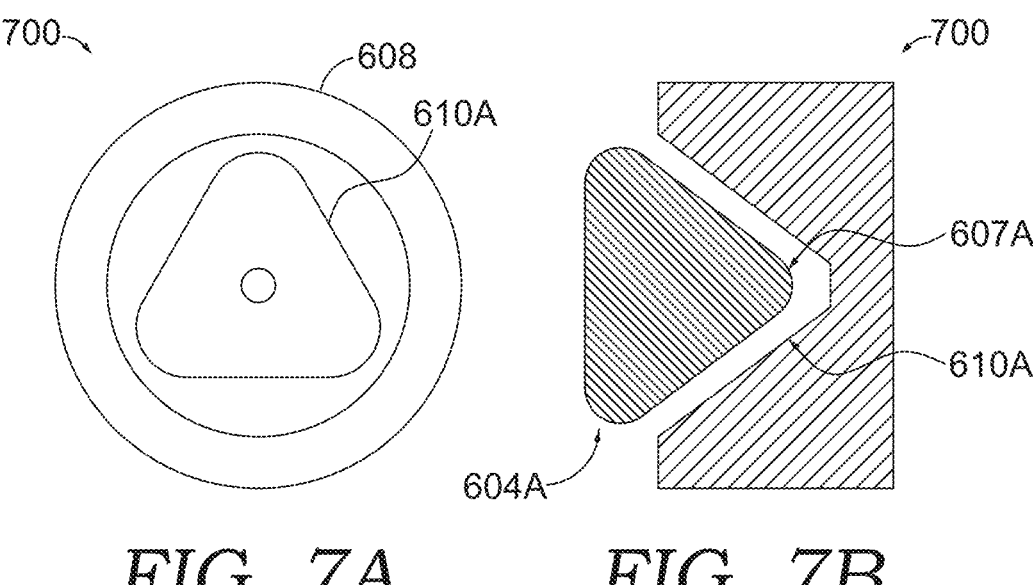
FIG. 7A FIG. 7B

PNEUMATIC DELIVERY SYSTEM AND METHODS FOR USE

CROSS-REFERENCE TO RELATED APPLICATIONS

This application is a continuation of U.S. application Ser. No. 17/711,733, filed Apr. 1, 2022, and entitled "Pneumatic Delivery System and Method for Use with Unmanned Vehicle Systems"; which claims the benefit of priority to U.S. Provisional Application No. 63/171,336, filed Apr. 6, 2021, entitled "Pneumatic Platform and Payload Containers for Unmanned Aerial Vehicles," and to U.S. Provisional Application No. 63/237,392, filed Aug. 26, 2021, entitled "Pneumatic Platform and Payload Containers for Unmanned Aerial Vehicles." Each of the aforementioned applications is expressly incorporated herein by reference in its entirety.

BACKGROUND

Unmanned Aerial Vehicles (UAVs) are used to deliver goods. Some logistics companies have recently started to commercially deliver parcels using UAVs, sometimes referred to as "drones" for short. The majority of deliveries performed by UAVs include relatively small, light parcels.

One current use case for UAV delivery involves delivering critical medical supplies or lab samples. UAVs have significantly reduced the delivery time historically experienced through traditional delivery methods. This has resulted in the faster processing of lab samples and more rapid deployment of critical medical supplies during emergencies.

SUMMARY

At a high level, the disclosed technology relates to pneumatic delivery systems that can be used by unmanned systems to transfer canisters containing delivery payloads.

In particular, the technology provides for a pneumatic delivery system that can move a canister to a position where it can be picked up using an unmanned system, such as a UAV. The canister is generally configured to enclose a payload that can then be transported by the unmanned system.

To do so, the pneumatic delivery system comprises a tube that can be pressured or depressurized to move the container through the tube. The tube comprises a tube opening at a location where the canister can be retrieved or dropped off by an unmanned system. At the tube opening, the pneumatic system comprises a transfer mechanism. The transfer mechanism includes transfer arms that are used to move the canister from within the tube to a position outside of the tube where it is accessible to an unmanned system used for delivering the canister, which can include a delivery payload within it.

The technology further comprises a pair of UAV arms that can be used to retrieve and release a canister to facilitate delivery of the canister. The UAV arms include a grasping member having a protrusion that is configured to be received by the canister. Using the UAV arms, the UAV can retrieve or drop off a canister from the pneumatic delivery system.

Further embodiments off the technology comprise mechanisms for positioning a canister within the pneumatic delivery system so that it can be moved about within the tube and for positioning the canister outside of the tube of the pneumatic delivery system for retrieval by a UAV or other unmanned system. One example mechanism uses a valve that opens and closes to move the canister in or out of the tube. Other examples include canister funnels that provide an enlarged opening where a UAV or other unmanned system can release a canister, which is then funneled into a smaller tube opening so that the canister positions itself within the tube when released into the canister funnel.

This summary is intended to introduce a selection of concepts in a simplified form that is further described below in the detailed description section of this disclosure. This summary is not intended to identify key or essential features of the claimed subject matter, nor is it intended to be an aid in determining the scope of the claimed subject matter.

Additional objects, advantages, and novel features of the technology will be set forth in part in the description that follows, and in part will become apparent to those skilled in the art upon examination of the following or learned by practice of the technology.

BRIEF DESCRIPTION OF THE DRAWINGS

The present technology is described in detail below with reference to the attached drawing figures, wherein:

FIG. 6 is a UAV having an example UAV canister mount with a gripping member for engaging canisters suitable for use with any of the described pneumatic delivery systems, in accordance with an embodiment described herein;

FIG. 7A is a side view of a canister suitable for use with the UAV gripping members illustrated in FIG. 6, in accordance with an aspect described herein;

FIG. 7B is a front view of the canister of FIG. 7A engaging the gripping member of FIG. 6, in accordance with an aspect described herein;

DETAILED DESCRIPTION

Figure 1A:
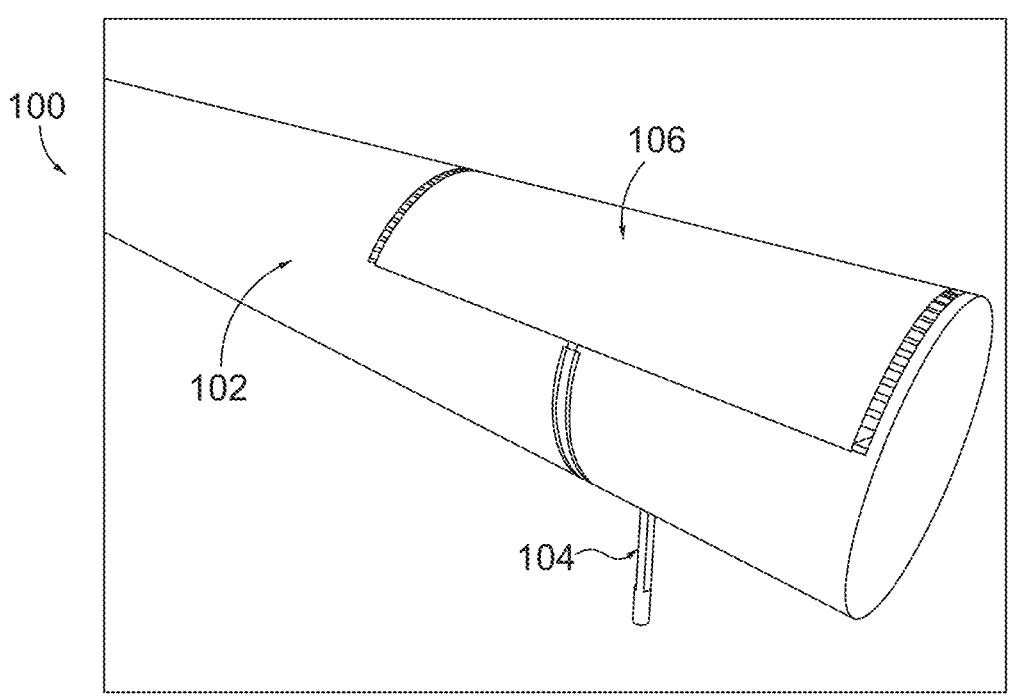
FIGS. 1A-1E illustrate an example pneumatic delivery system, in accordance with an embodiment described herein.

As noted, UAVs are utilized for delivering items, including parcels and laboratory samples. When delivering items using UAVs it can be beneficial to automatically load and offload items onto and from the UAV. The present disclosure provides systems and methods that improve aspects of item delivery using UAVs. Some aspects are also particularly useful for delivering items such as blood or lab samples across healthcare institutions.

Aspects of the disclosed technology relate to a pneumatic system that is suitable for loading and offloading the UAV with canisters having a chamber for holding items that are delivered using the UAV. The pneumatic system can move the canisters through a tube to load onto the UAV or move offloaded canisters away from the UAV and into the tube. The canister can be moved through the tube by increasing or decreasing the air pressure within the tube.

As noted, some aspects load a canister onto a UAV. One example method includes a transfer mechanism at one end of the tube. Here, the canister is moved to the end of a tube and the transfer mechanism transfers the canister onto the UAV for delivery. Similarly, the transfer mechanism may retrieve a canister from the UAV such that the canister can be moved through the tube.

This arrangement is particularly beneficial for moving items to a location for delivery by a UAV, for instance, moving an item from within a facility to an area outside of the facility where the UAV can deliver the item using the pneumatic delivery system. This is helpful in healthcare settings, in particular, because it provides an automated mechanism for loading or offloading UAVs with blood, laboratory samples, sensitive documents, and the like, thereby reducing the number of individuals involved in the chain of custody for such items, and may also be used to transport an item though a building to a correct department or laboratory. Although, it will be understood that there are many other use cases for the pneumatic delivery systems described herein.

In addition to the pneumatic delivery system described above, the present technology also describes a UAV gripping member that can be used to retrieve canisters from the pneumatic delivery systems provided herein and release canisters from the UAV to the pneumatic delivery systems described herein.

It will be realized that the systems previously described are only examples that can be practiced from the description that follows, and it is provided to more easily understand the technology and recognize its benefits. Additional examples are now described with reference to the figures.

While many of the aspects are described in the context of a UAV, it should be realized that the technology could be used with other unmanned systems, in additional to manned delivery systems. Thus, it is intended that were practicable, the described technology not be limited to use with UAVs, but should also be understood to work in conjunction with any unmanned or manned delivery system or technology.

With reference now to FIG. 1, an example pneumatic delivery system 100 is provided. Pneumatic delivery system 100 may be used with any of the aspects described herein. Reference is now made to FIGS. 1A-1E generally, unless otherwise specified. It will be understood that pneumatic delivery system 100, as illustrated, is just one example. Other arrangements and configurations, which may include fewer or more components, and may include any of the components described herein with reference to other figures, are contemplated and intended to be within the scope of this disclosure Pneumatic delivery system 100 comprises tube 102. The example aspect in these figures includes cover 106. Tube 102 further comprises tube wall 106 that defines channel 110. Tube 102 also comprises tube opening 111.

Pneumatic delivery system 100 further comprises transfer mechanism 104. The example transfer mechanism 104 comprises transfer shaft 112 and transfer arms 114A-114B, including first transfer arm 114A and second transfer arm 114B.

Figure 1B:
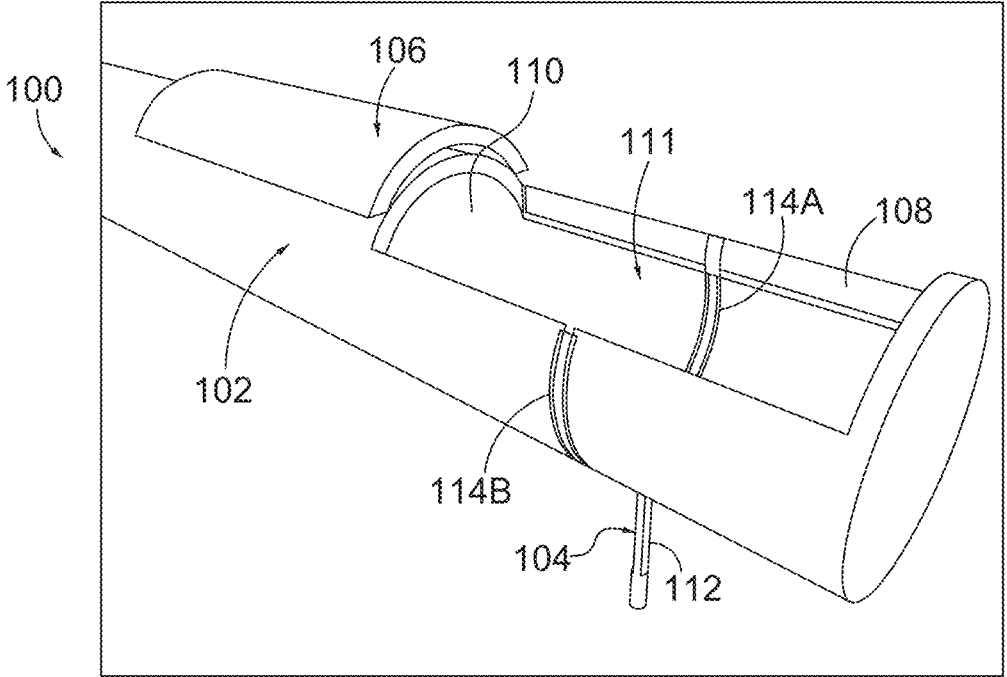

As depicted in FIGS. 1A and 1B, cover 106 at least partially covers tube opening 111 in a first cover position, which is illustrated in FIG. 1A. Cover 106 is movable between the first cover position (illustrated in FIG. 1A) and a second cover position (illustrated in FIG. 1B) that at least partially exposes tube opening 111, shown in FIG. 1B.

In this example, cover 106 comprises a semicircular design having a cover radius that is about equal to a tube radius. Cover 106 can be configured to move along tube 102 to transition between the first cover position and the second cover position. A motor, a stepper motor being one suitable example, can be used to actuate cover 106 and transition it between the first cover position and the second cover position. Other example mechanism for moving the cover between the first cover position and the second cover position include actuators, and relays or pneumatic actuated piston systems. Such pneumatic actuated systems are beneficial in that they can be configured to actuate from a first position to a second position using compressed air systems described herein for moving canister 116 through tube 102. In the aspect illustrated, cover 106 moves along an outside of tube 102. This can provide benefits in that moving along the outside of the tube allows the cover to not interfere with canister 116, which may be positioned within tube 102. Further, in some instances, cover 106 creates a hermetic or near-hermetic seal when in the first cover position. This keeps air from passing into and out of tube 102 when sealed. In cases where there is a near-hermetic seal, some air may pass into and out of tube 102. However, in this case, the volume of passing air does not preclude increasing or decreasing the air pressure within the tube so that canister 116 can pass through tube 102.

As previously noted, pneumatic delivery system 100 includes transfer mechanism 104. Transfer mechanism 104 may be movable from a first transfer position to a second transfer position.

Transfer mechanism 104 can be configured to engage canister 116. In the example illustrated, transfer mechanism 104 includes transfer shaft 112 and transfer arms 114A and 114B. Transfer arms 114A and 114B can be configured to engage canister 116.

In aspects, transfer arms 114A and 114B are coupled to transfer shaft 112. In a specific case, transfer arms 114A and 114B are pivotably coupled (e.g., hingedly coupled) to transfer shaft 112. In the example illustrated, each of transfer arms 114A and 114B comprises a first transfer arm end and a second transfer arm end. The first transfer arm end is pivotably coupled to transfer shaft 112. In this way, transfer arms 114A and 114B are movable relative to the point at which they are coupled to transfer shaft 112.

Transfer arms 114A and 114B may move from an open transfer arm position to a closed transfer arm position. In the closed transfer arm position, transfer arms 114A and 114B are closer in position relative to when transfer arms 114A and 114B are in the open transfer arm position. Put another way, the second transfer arm ends of transfer arms 114A and 114B are separated by a distance. The distance separating transfer arms 114A and 114B is greater when transfer arms 114A and 114B are in the open position than when transfer arms 114A and 114B are in the closed position.

Transfer mechanism 104 may include a biasing member to bias transfer arms 114A and 114B in the direction of the closed position. The biasing member may be a spring or any other elastic metal, or other suitable member, configured to impart a force on one or more of transfer arms 114A and 114B in the direction of the closed position.

Each of transfer arms 114A and 114B may comprise an angled transfer arm second end. The angled transfer arm second end may comprises an angled portion, as measured from the transfer arm second end to the transfer arm first end that is less than 90° (degrees). In some cases, the angle is less than 45°. Each angled portion is provided such that as canister 116 moves in a direction from the second transfer arm end toward the first transfer arm end, and contacts transfer arms 114A and 114B at the angled portions, transfer arms 114A and 114B are pushed against the bias and in the direction of the open position, thereby permitting canister 116 to be positioned between transfer arms 114A and 114B. When canister 116 is positioned between transfer arms 114A and 114B, transfer arm 104 is said to engage canister 116. As canister 116 moves beyond the angled portions of transfer arms 114A and 114B, transfer arms 114A and 114B move back toward the closed transfer arm position based on the bias. The bias may be provided by a biasing member, including any of those that are discussed herein. In this way, canister 116 may be secured by transfer arm 104. In some cases, canister 116 is secured in the directions of the first and second transfer arms end, and is slideable in a perpendicular direction relative to a theoretical plane extended from the first and second transfer arm ends. The position is beneficial because canister 116 may be secured vertically so that it can be carried by a UAV, but may be removed by sliding in the perpendicular direction to be provided to other components of pneumatic delivery system 100, such as tube 102.

In the example of transfer arms 114A and 114B illustrated in FIGS. 1A-1E, transfer arms 114A and 114B are formed into an arc. That is, each of transfer arms 114A and 114B may comprise a semicircular arc. The arc of each of transfer arms 114A and 114B may have a radius that is about equal to a radius of tube 102. The arc of each of transfer arms 114A and 114B may have a radius that is about equal to a radius of canister 116. It will be appreciated that other transfer arms may be shaped to correspond to a canister. While canisters herein have generally been described as cylindrical, in other implementations, a canister may take any form or shape. In such cases, the transfer arms may be shaped to correspond with the shape of the canister.

Transfer mechanism 104 may be movable between a first transfer position and a second transfer position. A motor, such as a stepper motor, can be configured to move transfer mechanism 104 between the first transfer position and the second transfer position.

Figure 1C:
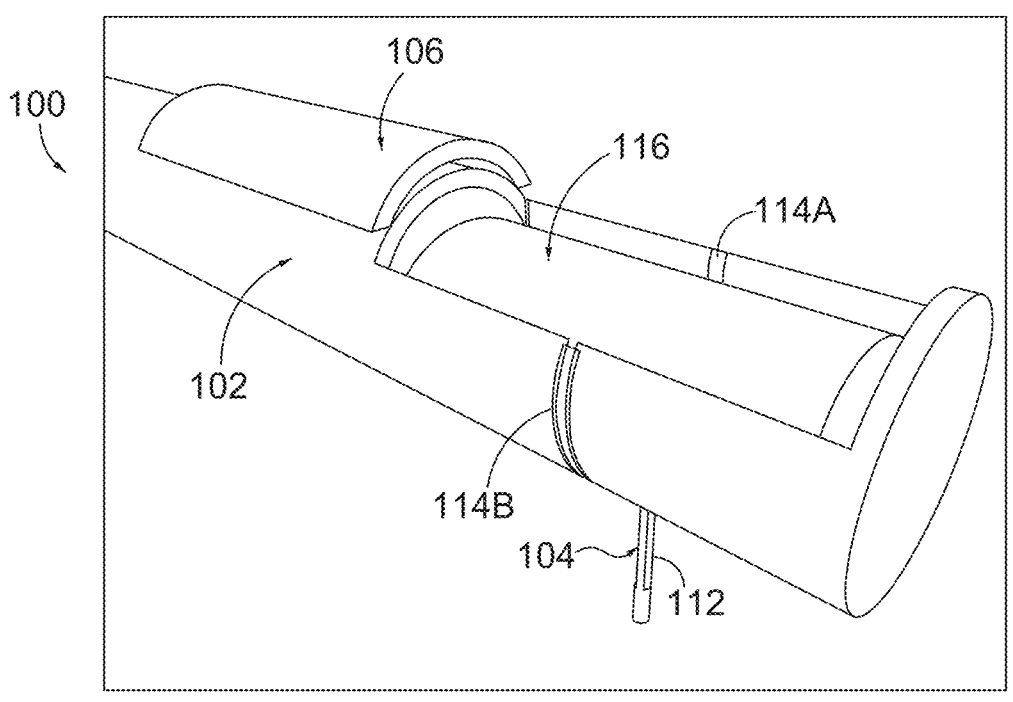

In the example illustrated, FIG. 1C depicts transfer mechanism 104 in the first transfer position. In the first transfer position, all of or at least a portion of transfer arms 114A and 114B may be recessed into tube wall 108. That is, tube 102 may have a recessed area within tube wall 108 that is sized to correspond to a size of at least a portion of transfer arms 114A and 114B. In FIG. 1C, a portion of tube wall 108 opposite tube opening 511 comprises the recessed areas in which transfer arms 114A and 114B can be recessed into in the first transfer position.

In an aspect, transfer arms 114A and 114B are within channel 101 when transfer mechanism 104 is in the first transfer position. That is, a location of all or a portion of transfer arms 114A and 114B is located inwardly from tube wall 108.

As also illustrated in the example of FIG. 1C, transfer mechanism 104 extends through tube wall 108. In this case, transfer shaft 112 of transfer mechanism 104 extends through tube wall 108. Transfer shaft 112 may extend through tube wall 108 at a location on the portion of tube wall 108 that is opposite tube opening 111. As illustrated, transfer shaft 112 extends through tube wall 108 when transfer arm 104 is in the first transfer position.

Figure 1D:
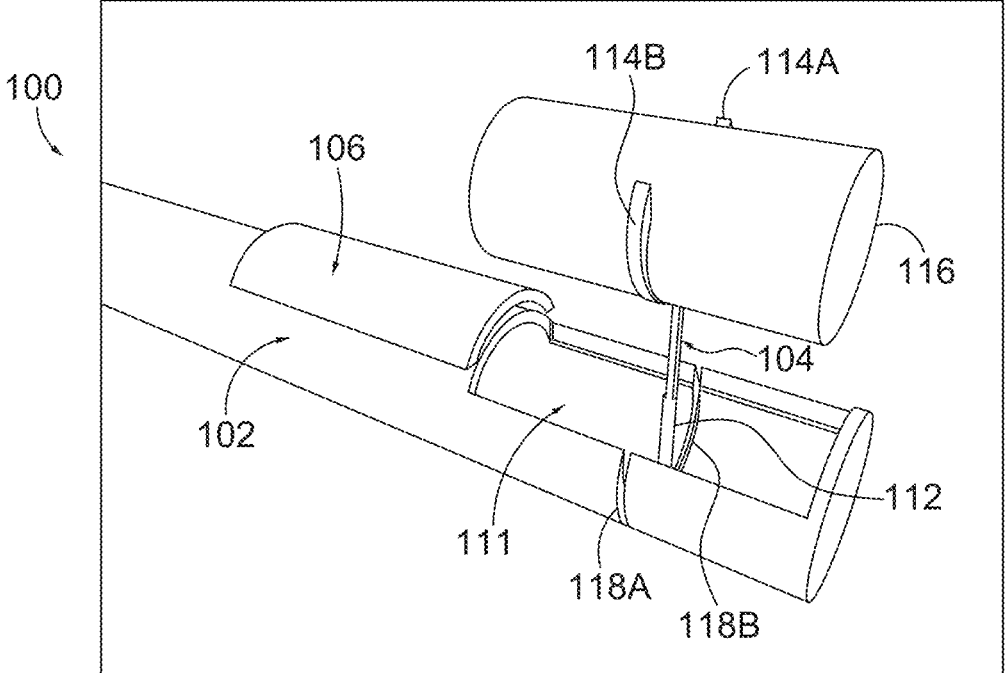

As described, transfer mechanism 104 can be moved from the first transfer position to the second transfer position, which is illustrated in FIG. 1D. In the second transfer position, all or a portion of transfer arms 114A and 114B may be positioned external to tube 102. That is, all or a portion of transfer arms 114A and 114B may be positioned outwardly from tube wall 108.

Figure 1E:
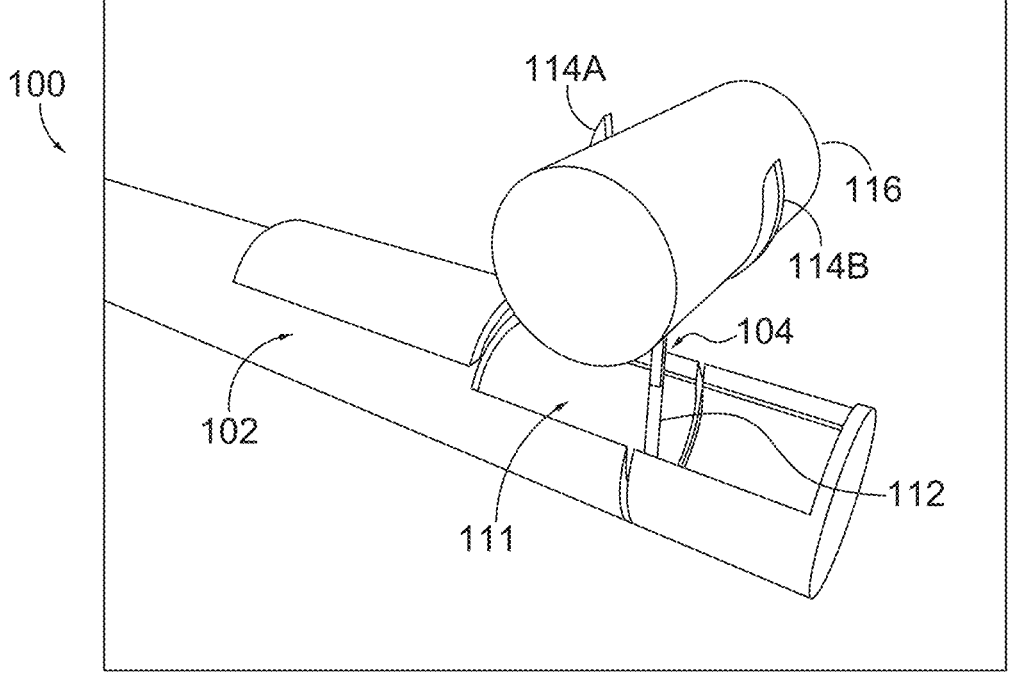

In some implementations, transfer mechanism 104 may change the orientation of canister 116. In FIG. 1D, canister 116 is illustrated in a first canister orientation. This may be changed to a second canister orientation, an example of which is illustrated in FIG. 1E. To change orientations, transfer mechanism 104 may be rotated about transfer shaft 112. In one instance, canister 116 is rotated 90°. This may be done in either direction. In another instance, the canister is rotated 180°. The canister may be rotated at an angle in a first or second direction, where the angle is less than or equal to 180°. By changing the orientation of canister 116, canister 116 may be maneuvered into a particular orientation in which it can be received by a UAV. This is beneficial because it may require less orientation of the UAV when dropping off or receiving a canister.

A method of using a pneumatic delivery system includes moving a canister 116 through tube 102 of pneumatic delivery system 100. Canister 116 may be moved through tube 102 by adjusting an air pressure within tube 102, including increasing or decreasing air pressure within tube 102. The method may include positioning canister 116 proximate to tube opening 111. In embodiments where tube 102 includes cover 106, cover 106 can be moved from a first cover position, such as the one illustrated in FIG. 1A, that covers the tube opening to a second cover position, such as the one illustrated in FIG. 1B, that at least partially exposes tube opening 111.

The method may include engaging canister 116 using transfer mechanism 104. Canister 116 may be engaged by transfer mechanism 104 by securing canister 116 using transfer arms 114A and 114B of transfer mechanism 104. Transfer mechanism 104 can be moved from a first transfer position where it engages canister 116 within channel 110 of tube 102 such as the position illustrated in FIG. 1C, to a second transfer position where canister 116 is at least partially moved through tube opening 111 and is at least partially positioned external from tube wall 102, such as the position illustrated in FIG. 5D. In some cases, transfer mechanism 104 releases canister 116. Canister 116 may be released onto a UAV, or another unmanned system, in a particular scenario. Release is also intended to include canister 116 being removed from transfer mechanism 104 without a specific action taken by transfer mechanism 104 to release it.

Another method of using pneumatic delivery system 100 includes positioning transfer mechanism 104 of the pneumatic delivery system 100 into a second transfer position (as illustrated in FIG. 1D, and engaging canister 116 at the second transfer position. In some cases, canister 116 is received from a UAV, or other unmanned system, delivering canister 116, meaning that transfer mechanism 104 engages canister 116 that is on the UAV or after the UAV has released canister 116. The method may include moving transfer mechanism 104 through tube opening 111 and into a first transfer position (as illustrated in FIG. 1C) where 116 is positioned within channel 110 of tube 102 of pneumatic delivery system 100. In an alternative aspect, canister 116 is received directly into channel 110 from a UAV as a result of the UAV releasing canister 116. The method may further include changing an air pressure within tube 102 and moving canister 116 through channel 110 away from tube opening 111 from which it was received.

Another method includes a method of assembling pneumatic delivery system 100. The method includes positioning 102 tube to extend from a first location to a second location, where the second location includes tube opening 111. The method many include configuring an air compressor to change the air pressure within tube 102. The air compressor can be configured to pull air out of tube 102 or to push air into tube 102 at one or more locations. One or more air compressors can be configured to change the air pressure within tube 102. One air compressor can be configured to change the air pressure from a location proximate the first location and a second air compressor can be configured to change the air pressure proximate to the second location. By proximate, it is meant relatively closer. That is, the location proximate the first location is a location relatively closer to the first location than the second location, and the location proximate the second location is relatively closer to the second location than the first location. In another aspect, one air compressor is configured to change the air pressure from a location that is within 20 feet (ft) of the first location and a second, a location within 20 ft of the second location. While this embodiment is described using two air compressors, it will be understood that only one may be employed at either location described, and that in other cases, more than two will be used.

In this method, and any other method or embodiment described herein, air compressors may include any type of system for moving air, including low-pressure air compressors (LPACs), which have a discharge pressure of about 150 pounds per square inch (10 bar) or less; medium-pressure compressors, which have a discharge pressure of about 151 to about 1,000 pounds per square inch (10.4 to 68.9 bar); high-pressure air compressors (HPACs), which have a discharge pressure above 1,000 pounds per square inch (69 bar); and may include any classification, such as single-stage reciprocating compressor, two-stage reciprocating compressor, rotary-screw compressor, rotary vane pump, scroll compressor, turbo compressor, centrifugal compressor, and so forth.

In this method, and any other method or embodiment described herein, tube 102 may be formed of any material, including metal, clay, rubber, or synthetic material, including synthetic polymers, such as nylon, vinyl, polyurethane, or polyethylene, among others.

The method of assembly may include positioning transfer mechanism 104 at a location corresponding to tube opening 111. Transfer mechanism 104 may be configured to move from a first transfer position (as illustrated in FIG. 1C) to a second transfer position (as illustrated in FIG. 1D). In one case, transfer shaft 112 of transfer mechanism 104 is inserted through a hole in tube 102 opposite tube opening 111. Transfer mechanism 104 may be coupled to a motor such that actuation of the motor moves transfer mechanism 104 between the first transfer position and the second transfer position. In some cases, the method includes forming a recessed area (such as first recessed area 118A or second recessed area 18B) within tube wall 108, where the recessed area has a space corresponding to a transfer arm (such as either first transfer arm 114A or second transfer arm 114B) of transfer mechanism 104. The recessed area may be formed though molding of tube wall 108 or by milling out an area of tube wall 108 in a size corresponding to at least a portion of transfer mechanism 104, or another like method.

The method of assembly may also include configuring cover 106 to at least partially cover tube opening 111 in a first cover position (such as that shown in FIG. 1A) and at least partially expose tube opening 111 in a second cover position (such as that shown in FIG. 1B). Cover 106 can be movably coupled to tube 102 in one particular case. Cover 106 can be coupled to motor that when actuated, moves cover 106 between the first cover position and the second cover position. In another aspect, cover 102 is movably coupled such that movement of canister 116 mechanically moves the cover between the first cover position and the second cover position.

The method of assembly may include positioning tube opening 111 proximate a landing area for a UAV. Proximate in this case includes within 10 ft of a landing area, including within 10 ft of a location at which a movable landing area can be positioned. In another aspect, tube opening 111 is positioned less than 10 ft from the landing area or location at which the movable landing area can be positioned. In some cases, tube opening 111 is positioned less than 5 ft from the landing area or location at which the movable landing area can be positioned. In another aspect, the method includes positioning tube opening 111 in line with a landing area opening. That is, tube opening 111 is positioned such that transfer mechanism 104 can move canister 116 through tube opening 111 and through the landing area opening.

In some cases, the method of assembly may include configuring a movable landing area. The movable landing area may be configured so that it moves from a first landing area position to a second landing area position. The method may also include configuring the movable landing area so that the second position is proximate tube opening 111. In a more specific case, the movable landing area is configured so that in the second landing area position, a landing area opening is in line with tube opening 111.

As will be understood, the methods previously described, and any of the methods throughout this disclosure, may including any one or more of the described steps, including additional or fewer steps, and may include performing these steps in any order.

Figure 2:
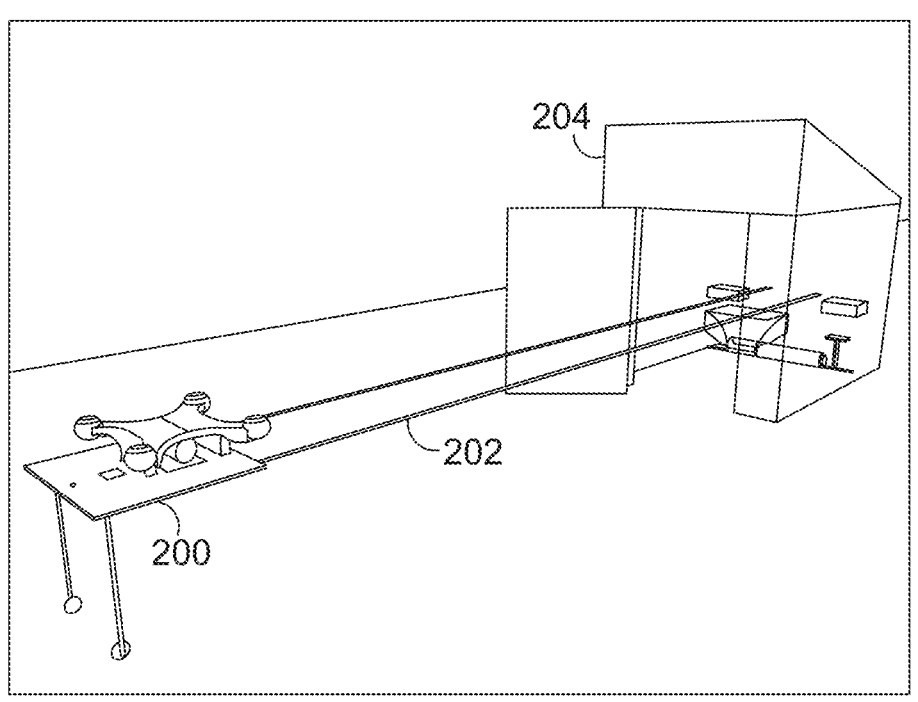
FIG. 2 illustrates aspects of another example pneumatic delivery system having a movable landing area, in accordance with an embodiment described herein.

Turning now to FIG. 2 is provided to illustrate aspects an example pneumatic delivery system having movable landing area 200. Movable landing area 200 may be any type of landing area, such as that illustrated here or illustrated and discussed in relation to other figures. As shown, movable landing area 200 is coupled to tracks 202. However, the movement mechanism for movable landing area 200 may include other mechanisms, such as those will be discussed. In this aspect, movable landing area 200 is used in conjunction with housing 204. Housing 204 may be any type of housing, including those that will be described. In an aspect, movable landing area 200 is provided as part of an autonomous ground vehicle (AGV), thus allowing movable landing area to be positioned based on movement of the AGV.

In the aspects illustrated by FIG. 2, moveable landing area 200 can have a first landing area position outside of housing 204, as shown in the figure. Movable landing area 200 can be moved about tracks 202 to a second landing area position within housing 204. In some cases, movable landing area 200 is moved to the second landing area position within housing 204 to drop off a canister or retrieve a canister from a pneumatic delivery system. Movable landing area 200 may also be moved to the second landing position within housing 204 for storage.

Pneumatic delivery system 100 of FIGS. 1A-1E is an example of a pneumatic system that can be used in conjunction with housing 204 and moveable landing area 200. For instance, components of pneumatic delivery system 100 may be positioned within housing 204, such that exchange of a canister, such as canister 116, between a UAV positioned on movable landing area 200 and pneumatic delivery system 100 can occur within housing 204.

Figure 3:
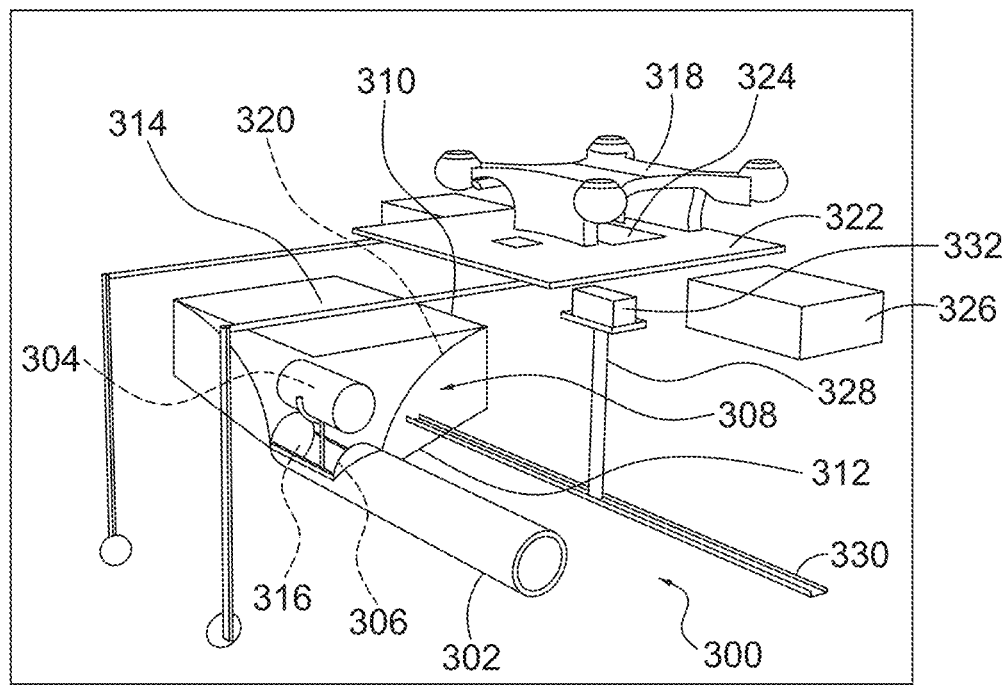
FIG. 3 illustrates aspects of an another example pneumatic delivery system, in accordance with an embodiment described herein.

With reference now to FIG. 3, aspects of an example pneumatic delivery system 300 are provided. In the system illustrated in FIG. 3, pneumatic delivery system 300 comprises tube 302 through which canister 304 travels. That is, a size of tube 302 is configured so that canister 304 can move through the tube. For instance, tube 302 can have a tube diameter, as measured from within tube 302 that is greater than a canister diameter of canister 304. In one specific example, the tube diameter is equal to the canister diameter or 1 millimeter (mm) less than the canister diameter. In another example, the tube diameter is equal to or less than 2 mm the canister diameter. In yet another example, the tube diameter is equal to or less than 5 mm the canister diameter. In practice, it is beneficial to minimize the difference between the tube diameter and the canister diameter such that canister 304 slides through tube 302 with minimal resistance, while still enabling sufficient pressure differential to be developed across the canister to move it pneumatically.

Canister 304 may be moved through tube 302 pneumatically. That is, a change in air pressure within tube 302 moves canister 304 through the tube. For example, canister 304 is positioned within tube 302. The air pressure may be increased within the tube relative to a first end of canister 304, which will move canister in the direction of the second end of the canister opposite the first away from the area of increased pressure. In another example, the air pressure can be decreased within tube 302 relative to the first end of canister 304. In this scenario, canister 304 will move in the direction of the first end toward the area of decreased pressure. Air pressure changes within tube 302 can be made using an air compressor. Any mechanism for changing the air pressure is intended to be included within the scope of air compressor.

Tube 302 comprises tube opening 306. While tube opening 306 is illustrated at a terminal end of tube 302, it will be recognized that tube opening 306 can be positioned anywhere along tube 302. In general, tube opening 306 allows canister 304 to be moved in and out of tube 302. As such, tube opening 306 is configured such that canister 304 can pass through tube opening 306. That is, the size of tube opening 306 is greater than a size of canister 304, in at least one orientation.

Some aspects of pneumatic delivery system 300 include canister funnel 308. Canister funnel 308 generally assists in passing canister 304 though tube opening 306 and into tube 302. In the example canister funnel 308 illustrated in FIG. 3, canister funnel 308 comprises first canister funnel end 310 and second canister funnel end 312. First canister funnel end 310 is opposite second canister funnel end 312 in this particular example, although other arrangements are contemplated.

First canister funnel end 310 comprises first canister funnel end opening 314. Second canister funnel end 312 comprises second canister funnel end opening 316. Second canister funnel end opening 316 may be relatively smaller than first canister funnel end opening 314. In some cases, a size of second canister funnel end opening 316 corresponds to a size of tube opening 306. In this way, canister 304 can be positioned anywhere within an area corresponding to first canister funnel end opening 314 and canister 304 is moved through canister funnel 308, through the relatively smaller second canister funnel end opening 316, and through tube opening 306. Thus, the placement accuracy of canister 304 when released into canister funnel 308 can be lower, allowing a UAV, such as UAV 318, to position canister 304 with less accuracy during a delivery and to make less intricate movements in an attempt to perfectly position canister 304, which is an advancement relative to conventional UAV delivery systems that require intricate movements during delivery. In some aspects, an inside portion of canister funnel 308 comprises inward arcing surface 320. Inward arcing surface 320 slows the movement of canister 304 through canister funnel 308, which protects the contents within canister funnel 308 that are being delivered.

In the example pneumatic delivery system 300 of FIG. 3, pneumatic delivery system 300 is used in conjunction with landing area 322. While landing area 322 is generally described in the context of a location from which UAV 318 can take off or land, it will be recognized that landing area 322 may also be a location where UAV 318 is positioned or repositioned before or after takeoff or landing.

As illustrated in FIG. 3, landing area 322 includes landing area opening 324. Landing area opening 324 is illustrated at the center of landing area 322. However, it will be recognized that landing area opening 324 can be positioned at any location on landing area 322. It will also be recognized that in some cases, another landing area aspect may not comprise a landing area opening, such as landing area opening 324.

Landing area opening 324 is illustrated as an opening through landing area 322 from a first landing area side to a second landing area side, illustrated here as a top and bottom side of landing area 322. A landing area opening perimeter edge of landing area opening 324 is positioned inwardly from a landing area perimeter edge of landing area 322. In aspects that include landing area opening 324, landing area opening 324 is beneficial for allowing canister 304 to pass through landing area 322, so that the canister can be provided to pneumatic delivery system 300, and as will be described, it also benefits loading of canister 304 from pneumatic delivery system 300 through landing area 322 and onto UAV 318. Thus, landing area opening 324 may be sized to permit canister 304 to pass through landing area 322. That is, in some orientations, landing area opening 324 is larger in size than canister 304. In some aspects, landing area 322 is positioned or can be moved to a position that aligns first canister funnel end opening 314 and landing area opening 324. That is, when canister funnel end opening 314 and landing area opening 324 are aligned, canister 304 can pass through landing area 322 and into canister funnel 308.

Landing area 324 may also be movable, as is the example landing area 324 illustrated in FIG. 3. Movable landing areas generally provide additional benefits, as moving the landing area can sometime be easier than maneuvering a UAV, such as UAV 318. As illustrated, landing area 322 comprises rails coupled to a movement mechanism, which are illustrated here as wheels. It will be understood that other movement mechanisms, including tracks, pulleys, hydraulics, and the like can be used to move landing area 322 into a position. In another embodiment, landing area 324 is part of or moved by an autonomous ground vehicle (AGV). Each of these movement examples, along with other similar mechanisms, is intended to be within the scope of this disclosure.

Another benefit provided by a movable landing area is that it allows selective delivery or loading of a canister from a particular pneumatic delivery system when there is more than one system, such as when different pneumatic delivery systems are configured to move canisters to different locations. For example, a first pneumatic delivery system is configured to move canisters to and from a first location based on a first tube. A second pneumatic delivery system is configured to move canisters to and from a second location base on a second tube. Using a movable landing area, a UAV may be positioned on the landing area. The landing area is moved to selectively position it at either a first tube opening or second tube opening respectively corresponding to the first tube and the second tube. In this way, a canister can be retrieved from either the first or second pneumatic delivery system, or delivered to the first or second location using the first or second pneumatic delivery system.

The example aspect in FIG. 3 further comprises one or more charging stations, such as charging station 326 for charging UAV 318. The example of FIG. 3 is further illustrated having a battery delivery system that comprises actuation member 328 movable about track 330. Actuation member 328 is also vertically movable or rotatable. In this way, actuation member 328 can move an object, such as battery 332 to any spatial direction or orientation. Other aspects that move actuation member 328 are contemplated, and track 330 is provided as only an example. In another aspect, an actuation member is flexible and is self-positioning by flexing of the actuation member. Here, actuation member 328 can be positioned to provide UAV 318 with battery 332 or remove from UAV 318 battery 332. Actuation member 328 can be moved to a position adjacent and in line with landing area opening 324, such that the battery is provided to UAV 318 or removed from UAV 318 through landing area opening 324.

It will be understood that the pneumatic delivery system 100 of FIGS. 1A-1E are suitable for use as the pneumatic delivery system 300 of FIG. 3. Further, aspects of FIG. 3 can be used in conjunction with aspects of FIG. 2. That is movable landing area 200 may correspond to landing area 322, and likewise pneumatic delivery system 300 may be provided within housing 204 of FIG. 2.

Figure 4:
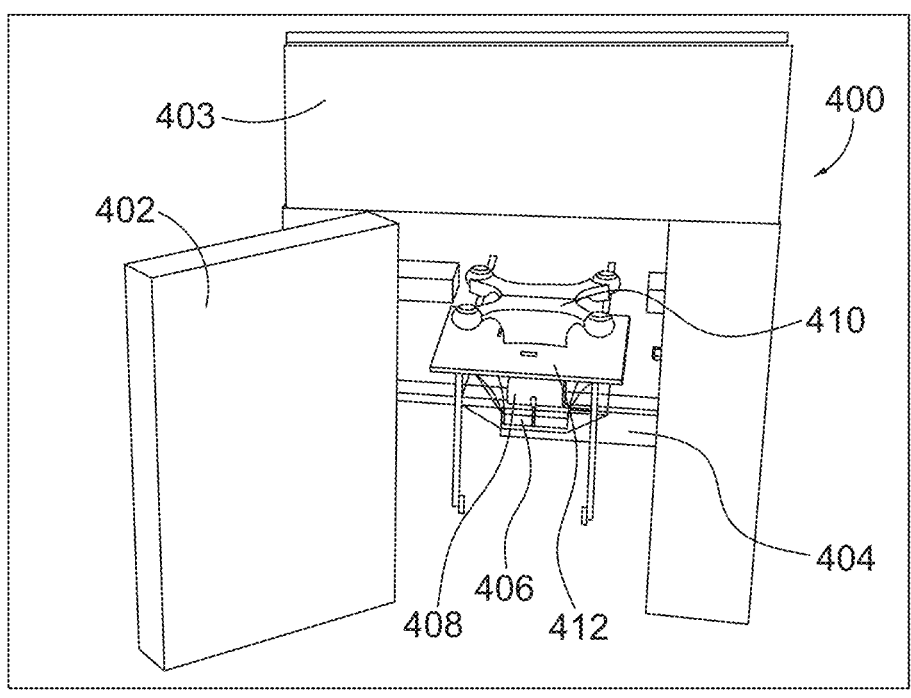
FIG. 4 illustrates another pneumatic delivery system a housing, in accordance with an embodiment described herein.

FIG. 4 illustrates another example housing 400 suitable for use with the technology. In this example, movable section 402 transitions from a first housing position that encloses landing area 412, illustrated having UAV 410, to a second housing position that exposes landing area 412. Housing 400 of FIG. 4 similarly protects, by covering or enclosing, part of a pneumatic delivery system, such as tube 404 and tube opening 406, which can be used in conjunction with canister 408, as is described in other examples.

In some cases, such as that illustrated in FIG. 4, housing 400 includes a second movable section 403. First movable section 402 may provide access to landing area 412 from a side of landing area 412. Second moveable section 403 may provide vertical access to landing area 412. Like first movable section 402, second movable section 403 may transition from a first housing position that encloses landing area 412, illustrated in FIG. 4, to a second housing position exposing landing area 412. Access to landing area 412 from the side is beneficial for retrieving a UAV or performing maintenance on the UAV or other aspects of the pneumatic delivery system. Vertical access to landing area 412 is beneficial because it may provide a clear area for taking off and landing, and is particularly beneficial for vertical takeoff and landing type UAVs.

It will also be understood, that housing 400 may work in conjunction with other aspects described herein. For example, housing 400 may be used with movable landing area, such as movable landing area 200 of FIG. 2. For instance, the housing of FIG. 4 may be suitable for use as housing 204 of FIG. 2. More generally, however, it should be understood that housing 400 in FIG. 4 could be used in conjunction with any of the systems or methods described herein.

Figure 5:
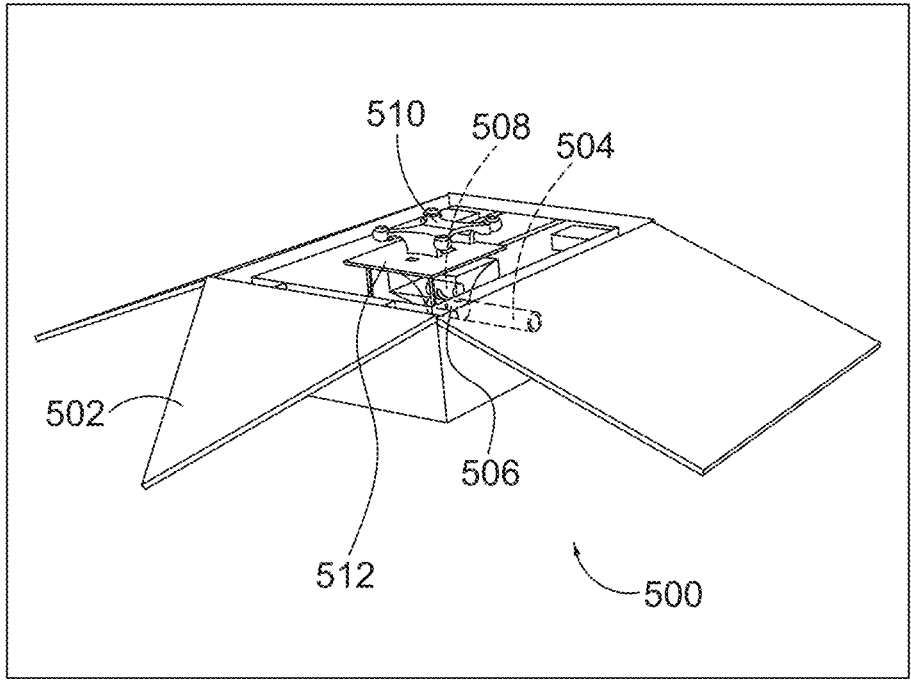
FIG. 5 is an example of another pneumatic delivery system having a housing, in accordance with an embodiment described herein.

Referencing now FIG. 5, FIG. 5 illustrates at least part of an example pneumatic delivery system. This example system includes another example housing 500 that provides protection to parts of the pneumatic delivery system, including tube 504 and tube opening 506. The pneumatic delivery system is suitable for use in an outdoor area, including rooftops and other areas that are traversable by UAVs. Housing 500 may help protect part of the pneumatic delivery system from inclement conditions when not in use. It may also house a UAV, such as UAV 510, thus serving to provide a security mechanism for the UAV, which may dock on part of the system to retrieve or release a load, such as canister 508.

Housing 500 may partially cover or fully cover parts of the pneumatic delivery system in one more positions. As illustrated in FIG. 5, housing 500 comprises movable section 502. Movable section 502 comprises a first housing position and a second housing position. The first housing position may completely enclose landing area 512, while the second position may expose landing area 512. FIG. 5 is illustrated with movable section 502 in the second housing position that exposes landing area 512 so that it may be accessed by UAV 510 when landing on landing area 512 or lifting off from landing area 512. Movable section 502 transitions between the first and second housing positions. It may do so by movably coupling, such as hingedly coupling, to a location of housing 500. In an aspect, movable section 502 is not coupled to housing 500, but is moved from a first position covering an opening of housing 500 to a second position that exposes the opening of housing 500.

Housing 500 and other components of FIG. 5 are intended for use with any of the embodiment described herein. For instance, Housing 500 may be used to cover pneumatic delivery system 100 of FIG. 1.

As noted, pneumatic delivery systems, such as those that have been described, can be used to exchanged canisters having delivery payloads between UAVs or other unmanned (and sometimes manned) systems to facilitate delivery. FIG. 6 and FIG. 7 illustrate aspects of a UAV and canister system that can be used to facilitate this exchange and be used by UAVs to delivery canisters, including releasing canisters to pneumatic delivery systems and retrieving canisters from pneumatic delivery systems.

As illustrated in FIG. 6, canister mount 600 for carrying loads is provided. Canister mount 600 comprises one or more UAV arms 602A-602B attached to UAV 601. Each UAV arm 602A-602B respectively comprises a gripping member 604A-604B attached at a first end of each arm 602A-602B, opposite a second end of each arm 602A-602B that is coupled to UAV 601. Each gripping member 604A-604B is configured to be received into a receiving area of a corresponding portion 606A-606B of canister 608. Each gripping member 604A-604B has a protruding portion at each end. A movement mechanism operable to move the UAV arms 602A-602B from a first positon to a second position is operable to cause the UAV arms 602A-602B to engage canister 608 in the first position, and to disengage canister 608 in the second position. When UAV arms 602A-602B are in the first position, the movement mechanism is operable to move the UAV arms into a third position to reorient the canister for being received at landing pad.

FIG. 7A depicts a side view of canister 608, having a receiving area 610A configured to receive a gripping member, such as one or gripping members 604A-604B of FIG. 6.

Receiving area 610A may comprise a recessed area within canister 608. It will be understood that canister 608 may have other recessed areas. However, for clarity, only one example is illustrated and described. While shown at an end of canister 608, the recessed area of receiving area 610A may be located at any position of canister 608.

As noted, each of one or more griping members 602A-602B of canister mount 600 comprises gripping member 604A-604B that each comprises a protruding portion. As illustrated in FIG. 7B, protruding portion 607A of gripping member 606A is configured to be received by receiving area 610A canister 608. Only one example of a protruding portion of a UAV arm and a receiving area is illustrated in FIG. 7B as protruding portion 607A and receiving area 610A. However, it will be understood that UAV 601 may comprise additional UAV arms with protruding portions of gripping members, while canister 608 may comprise additional receiving areas.

UAV 601 may be configured to position canister 608 in any orientation. The movement of the canister from the first position to the second position may be linear. The movement of the canister from the first position to the third position may be rotational, e.g., by rotating UAV arms 602A-602B. The canister's ability to move linearly and to rotate allow for greater flexibility in transporting the canister include being able to retrieve and deliver the canister in awkward, tight or previously unreachable locations. Other embodiments may include transporting canisters that require rotation during delivery due to health and safety needs or product preservation requirements.

In the example illustrated, each gripping member 604A-604B has a protruding portion that is configured to respectfully nest into receiving areas 610A-610B. In one example, each of the gripping members and corresponding receiving portions comprises three or more faces. As an example, receiving area 610A comprises three internal faces within a recessed portion of receiving area 610A. Gripping member 604A comprises three corresponding faces on the protruding portion. Such configurations provide benefits for retrieving and securing canister 608. Particularly, this geometric arrangement allows canister 608 to be gripped at any orientation. However, during flight, the faces prevent canister 608 from rotating or otherwise becoming disengaged, thereby providing a secure method of retrieval and transport of canister 608.

Figure 8:
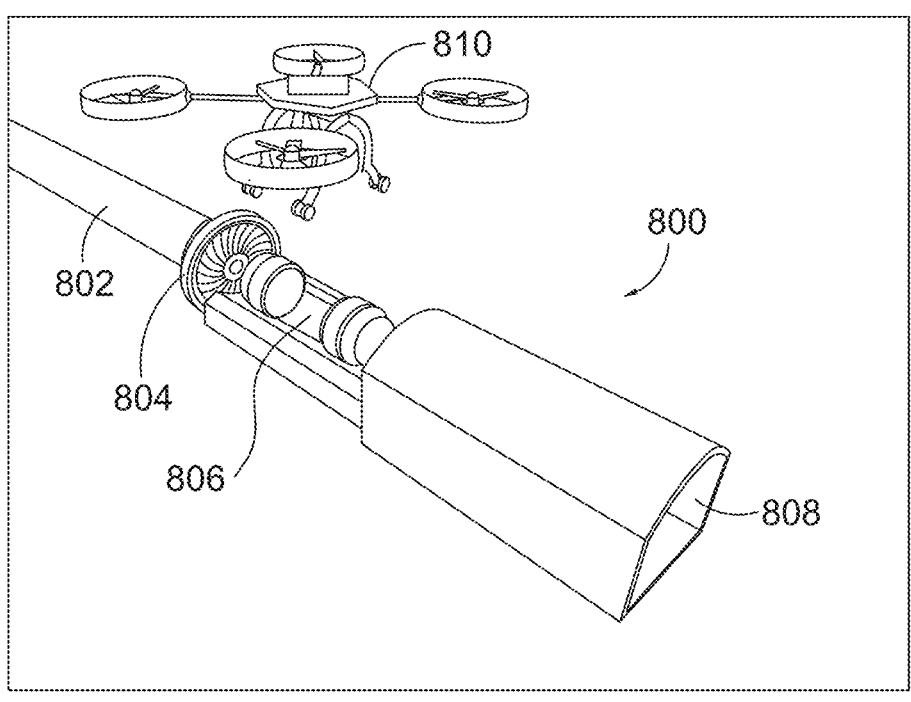
FIG. 8 is another example pneumatic delivery system having a valve, in accordance with an aspect described herein.
Figure 9:
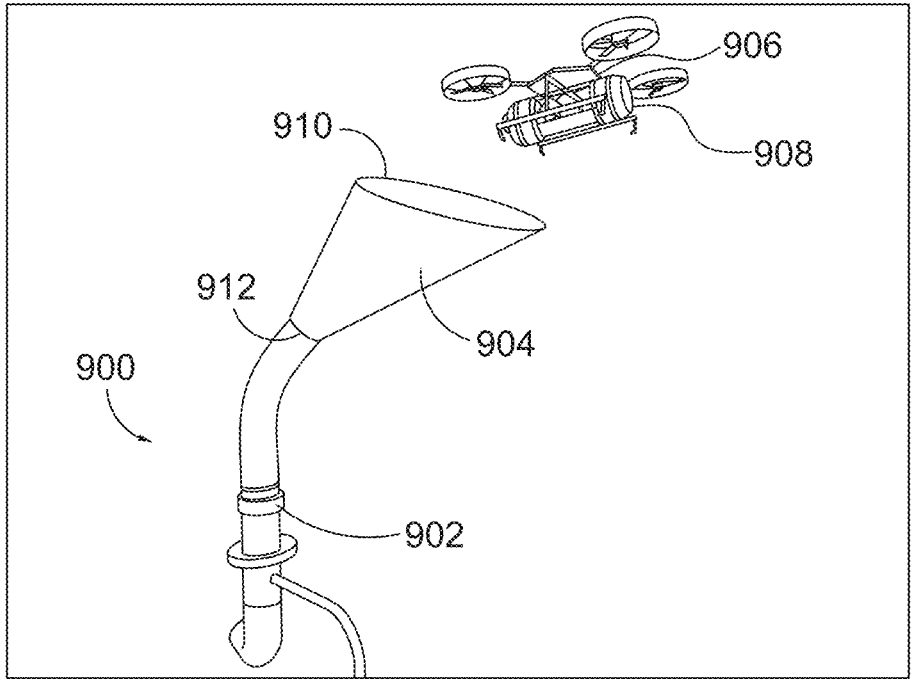
FIG. 9 is another example pneumatic delivery system having an example canister funnel, in accordance with an aspect described herein.
Figure 10:
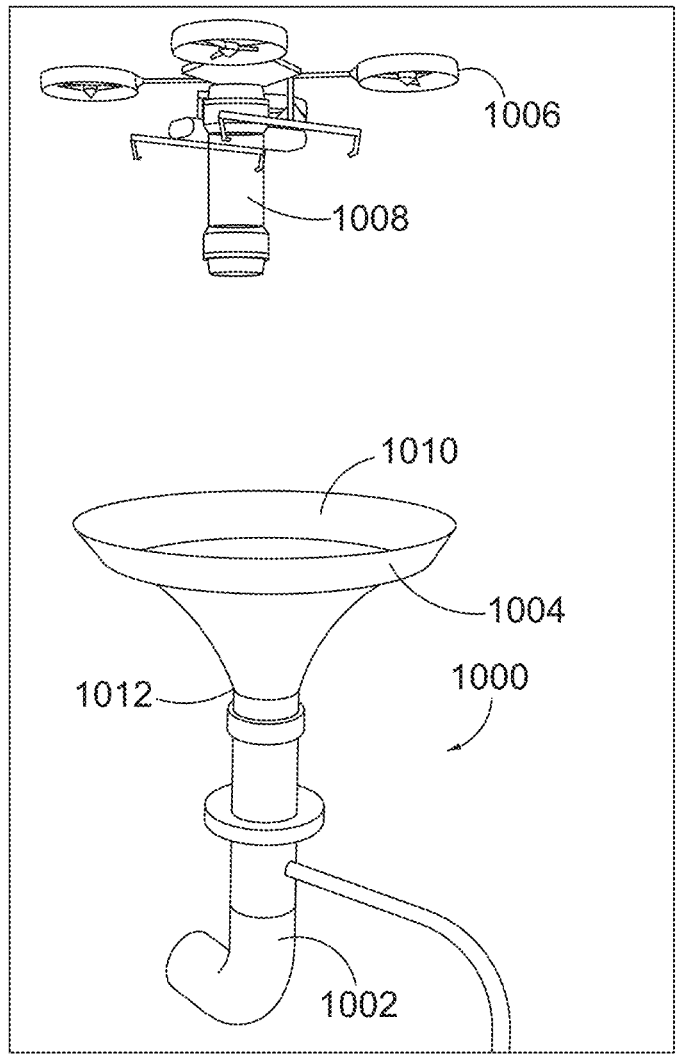
FIG. 10 is another example pneumatic delivery system having another example canister funnel, in accordance with an aspect described herein.

FIGS. 8-10 illustrate various example pneumatic delivery systems. In particular, the system of these figures provides various mechanism by which a pneumatic delivery system may receive a canister from a UAV or provide a canister to a UAV. Such systems may be used in conjunction with any of the systems described herein.

FIG. 8 illustrates pneumatic delivery system 800. Pneumatic delivery system 800 comprises tube 802. At a tube opening, pneumatic delivery system 800 comprises valve 804. Valve 804 may be a high-speed valve. In general, valve 804 increases and decreases a size of an opening of valve 804. One example includes an iris valve. Valve 804 includes valves that mechanically expand and contract the size of the opening. In another example, valve 804 includes a flexible material, such as rubber or a synthetic polymer that has elastic properties, thus allowing the material surrounding the opening to expand and contract to increase or decrease the size of the opening. Yet another example provides for an elastomeric tube circumvented with two rings that, when rotated in opposing directions, opens and closes the elastomeric tube. Valve 804 may comprise a one-way valve, permitting canister 806 to enter or exit tube 802 based on the orientation of the one-way valve. The valve may also be a two-way valve, permitting both entry and exit into and out of tube 802 by canister 806.

In use, canister 806 may be inserted into the opening. In those applications where a valve is mechanically opened, an optical sensor can be placed at a location outside of tube 802 to identify the presence of canister 806. When canister 806 is detected by the optical sensor, the opening is increased in size so that canister 806 can pass through the opening and into tube 802. Once within tube 802, canister 806 is no longer detected by the optical sensor, and valve 804 reduces the size of the opening. In cases, where value 804 is a flexible material, then canister 806 is pushed against a location of valve 804 corresponding to the opening, causing the opening to increase in size and canister 806 to pass through the opening and into tube 802, upon which time after, the opening decreases in size due to the elastic properties. In some instances, the system may comprise canopy 808. Canopy 808 can be configured to slide over canister 806 to provide a hermetic seal or near hermetic seal surrounding canister 806. This can aid the change of air pressure around canister 806, thereby allowing canister 806 to be moved in and out of tube 802.

FIG. 9 provides another example pneumatic delivery system 900. In this example, tube 902 of pneumatic delivery system 900 includes canister funnel 904 at a tube opening of tube 902. Canister funnel 904 includes a first opening 910 that is relatively larger than a second opening 912. Second opening 912 corresponds to the tube opening. In this way, UAV 906 has a relatively larger opening in which to release canister 908 so that it moves through the tube opening and into tube 902. In this particular example, canister funnel 904 is positioned at an angle. In this illustration, canister funnel 904 is positioned at about a 60 degree angle. In some cases, canister funnel 904 can be positioned at about equal to or between 20 degrees and 80 degrees. The angle is beneficial because it allows UAV 906 to release canister 908 horizontally relative to the horizon, which can reduce or eliminate the need for a UAV to hover, thereby allowing some additional types of UAVs, such as those utilizing forward flight airfoils, to be used with the system. In some cases, a valve is provided where second opening 912 of canister funnel 904 engages the tube opening. This allows canister 908 to be positioned at the tube opening until pneumatic delivery system 900 moves canister 908 through an opening in the valve as previously discussed. This further aids in conserving the air pressure within the pneumatic system when closed.

FIG. 10 provides another example pneumatic delivery system 1000. In this example, tube 1002 of pneumatic delivery system 1400 includes canister funnel 1004 at a tube opening of tube 1002. Canister funnel 1004 includes a first opening 1010 that is relatively larger than a second opening 1012. Second opening 1012 corresponds to the tube opening. In this way, UAV 1006 has a relatively larger opening in which to release canister 1008 so that it moves through the tube opening and into the tube 1002. In this particular example, first opening 1010 opens horizontal relatively to the horizon. The horizontal second opening 1012 of canister funnel 1004 provides a relative larger area where UAV 1004 may hover when releasing canister 1008 into canister funnel 1004 and into tube 1002. A valve may be be provided at first opening 1010 or second opening 1012 of canister funnel 1004 to provide similar benefits to those previously discussed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" or "having" has the same broad meaning as the word "comprising." In addition, words such as "a" and "an," unless otherwise indicated to the contrary, include the plural as well as the singular. Thus, for example, the constraint of "a feature" is satisfied where one or more features are present. Furthermore, the term "or" includes the conjunctive, the disjunctive, and both (a or b thus includes either a or b, as well as a and b).

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated the accompanying drawings is to be interpreted as illustrative and not in a limiting sense.

What is claimed is:

1. A system comprising:
a tube comprising a tube wall and a channel extended within the tube wall, wherein the tube is configured to move a canister through the channel pneumatically;
a tube opening within the tube wall; and
a transfer mechanism comprising a shaft, a first transfer arm, a second transfer arm, and a biasing member, each of the first transfer arm and the second transfer arm is pivotably coupled to the shaft, the first transfer arm and the second transfer arm are movable between an open position and a closed position, and the biasing member is configured to bias the first transfer arm and the second transfer arm to the closed position, wherein:
the transfer mechanism is configured to engage the canister via the first transfer arm and the second transfer arm while in a first transfer position, extend the shaft to position the first transfer arm and the second transfer arm through the tube opening, and rotate about the shaft to change an orientation of the canister from the first transfer position to a second transfer position, and
the first transfer arm and the second transfer arm are configured such that movement of the canister causes the first transfer arm and the second transfer arm to push against the bias to the open position, thereby permitting the canister to be removed from the transfer mechanism.

2. The system of claim 1, wherein in the first transfer position, at least a portion of the first transfer arm and the second transfer arm are recessed into the tube wall.

3. The system of claim 2, wherein the tube comprises a recessed area within the tube wall that is sized to correspond to a size of at least the portion of the first transfer arm and the second transfer arm.

4. The system of claim 1, wherein each of the first transfer arm and the second transfer arm comprises an angled portion that is configured such that as the canister moves beyond the angled portion of each of the first transfer arm and the second transfer arm, the first transfer arm and the second transfer arm move back toward the closed position based on the bias.

5. The system of claim 1, further comprising a cover, the cover movable between a first cover position that at least partially covers the tube opening and a second cover position that at least partially exposes the tube opening.

6. The system of claim 1, further comprising a housing, the housing enclosing at least a portion of the tube comprising the tube opening, the housing comprising a movable section having a first housing position and a second housing position, the first housing position enclosing a landing area within the housing and the second housing position exposing the landing area.

7. The system of claim 1, further comprising a canister funnel, the canister funnel having a first canister funnel end with a first canister funnel end opening and a second canister funnel end with a second canister funnel end opening, the second canister funnel end opening being relatively smaller than the first canister funnel end opening, the second canister funnel end opening aligned with the tube opening.

8. A method comprising:
moving a canister through a tube comprising a tube wall and a channel extending within the tube wall;
positioning the canister proximate a tube opening within the tube wall;
engaging the canister with a first transfer arm and a second transfer arm when the canister is at a first position;
moving the first transfer arm and the second transfer arm through the tube opening to position the canister external to the tube wall;
rotating the first transfer arm and the second transfer arm to change an orientation of the canister from the first position to a second position; and
removing the canister from the first transfer arm and the second transfer arm.

9. The method of claim 8, wherein removing the canister from the first transfer arm and the second transfer arm comprises moving the canister to cause the first transfer arm and the second transfer arm to push against a bias to an open position, thereby permitting the canister to be removed from the transfer mechanism.

10. The method of claim 8, further comprising moving a cover from a first cover position that covers the tube opening to a second cover position that exposes the tube opening.

11. A system comprising:
a tube comprising a tube wall and a channel extended within the tube wall, wherein the tube is configured to move a canister through the channel pneumatically;
a tube opening within the tube wall; and
a transfer mechanism comprising a shaft, a first transfer arm, and a second transfer arm, each of the first transfer arm and the second transfer arm are movable between an open position and a closed position, wherein:
the transfer mechanism is configured to engage the canister via the first transfer arm and the second transfer arm while in a first transfer position, extend the shaft to position the first transfer arm and the second transfer arm through the tube opening, and rotate about the shaft to change an orientation of the canister from the first transfer position to a second transfer position, and the first transfer arm and the second transfer arm are configured such that movement of the canister causes the first transfer arm and the second transfer arm to move from the closed position to the open position, thereby permitting the canister to be removed from the transfer mechanism.

12. The system of claim 11, wherein in the first transfer position, at least a portion of the first transfer arm and the second transfer arm are recessed into the tube wall.

13. The system of claim 12, wherein the tube comprises a recessed area within the tube wall that is sized to correspond to a size of at least the portion of the first transfer arm and the second transfer arm.

14. The system of claim 11, wherein the each of first transfer arm and the second transfer arm comprises an angled portion that is configured such that as the canister moves beyond the angled portion of each of the first transfer arm and the second transfer arm, the first transfer arm and the second transfer arm move back toward the closed position.

15. The system of claim 11, further comprising a cover, the cover movable between a first cover position that at least partially covers the tube opening and a second cover position that at least partially exposes the tube opening.

16. The system of claim 11, further comprising a housing, the housing enclosing at least a portion of the tube comprising the tube opening, the housing comprising a movable section having a first housing position and a second housing position, the first housing position enclosing a landing area within the housing and the second housing position exposing the landing area.

17. The system of claim 11, further comprising a canister funnel, the canister funnel having a first canister funnel end with a first canister funnel end opening and a second canister funnel end with a second canister funnel end opening, the second canister funnel end opening being relatively smaller than the first canister funnel end opening, the second canister funnel end opening aligned with the tube opening.

* * * * *